(12) United States Patent
Teeter, Jr. et al.

(10) Patent No.: US 8,789,773 B2
(45) Date of Patent: Jul. 29, 2014

(54) RECYCLING PROCESS FOR DISCARDED ROOF SHINGLES

(71) Applicant: Crown Iron Works Company, Roseville, MN (US)

(72) Inventors: Floyd Charles Teeter, Jr., Woodbury, MN (US); Philip Fisher, Ham Lake, MN (US); Catherine Selvaag, Apple Valley, MN (US); Raymond Johnson, Minnetonka, MN (US)

(73) Assignee: Crown Iron Works Company, Roseville, MN (US)

( * ) Notice: Subject to any disclaimer, the term of this patent is extended or adjusted under 35 U.S.C. 154(b) by 85 days.

(21) Appl. No.: 13/665,417

(22) Filed: Oct. 31, 2012

(65) Prior Publication Data

US 2013/0104774 A1  May 2, 2013

Related U.S. Application Data

(60) Provisional application No. 61/554,261, filed on Nov. 1, 2011.

(51) Int. Cl.
| | |
|---|---|
| *B02C 23/06* | (2006.01) |
| *B02C 21/00* | (2006.01) |
| *C08L 95/00* | (2006.01) |
| *C08J 11/04* | (2006.01) |

(52) U.S. Cl.
CPC ............. *C08L 95/00* (2013.01); *C08L 2555/34* (2013.01); *C08J 11/04* (2013.01); *C08J 2395/00* (2013.01)
USPC .............................................. 241/16; 241/21

(58) Field of Classification Search
USPC ............... 241/16, 21, 22, 24.11, 24.12, 101.8
See application file for complete search history.

(56) References Cited

U.S. PATENT DOCUMENTS

| | | | | |
|---|---|---|---|---|
| 4,222,851 | A * | 9/1980 | Good et al. .................... | 208/45 |
| 4,706,893 | A * | 11/1987 | Brock ............................ | 241/23 |
| 5,098,025 | A * | 3/1992 | Drouin et al. ................. | 241/21 |
| 5,201,472 | A | 4/1993 | Brock | |
| 5,258,222 | A | 11/1993 | Crivelli | |
| 6,582,610 | B2 * | 6/2003 | Williams et al. .............. | 210/712 |
| 6,692,669 | B2 | 2/2004 | Mischo | |
| 7,913,940 | B2 | 3/2011 | Harmon | |
| 2013/0266374 | A1 * | 10/2013 | Reinke .......................... | 404/77 |

FOREIGN PATENT DOCUMENTS

EP        1 915 420 B1     1/2010

* cited by examiner

*Primary Examiner* — Faye Francis
(74) *Attorney, Agent, or Firm* — Nawrocki, Rooney & Sivertson, P.A.

(57) ABSTRACT

A process extracts and reclaims the components of an asphalt-based material having as constituents at least asphalt and one or more solid materials. A solvent for asphalt dissolves the asphalt constituent to form a slurry of asphalt-solvent liquid and the solid materials. The liquid and the solids in the slurry are then separated. The liquid is separated into solvent and asphalt. The solids, when of more than one type, are separated into at least one pure constituent solid. In a preferred embodiment, the process runs in a continuous mode with the various materials flowing as streams into spaces where steps of the process operate. The process can be used for both worn roofing shingles and for asphalt paving.

9 Claims, 2 Drawing Sheets

RECYCLING PROCESS FOR DISCARDED ROOF SHINGLES

BACKGROUND

Landfills receive large masses of discarded asphalt-based materials. The term "asphalt-based materials" includes for example, roofing shingles and felt; asphalt paving; asphalt-treated wood products such as posts, poles, and landscaping timbers; and tar paper.

Taking shingles as an example, in most cases, these used shingles result from tear-offs prior to reroofing a building. To avoid overloading the building structure, shingles must be torn off after at most three layers have been installed. In other cases, manufacturers or wholesalers discard new shingles with manufacturing defects or that are too old to use.

Whenever shingles are scrapped, they must be disposed of properly. The usual practice now is to pay for their disposal. In some cases this may amount to 10-20% of the total cost of the reroofing project.

Shingles and other asphalt-based materials do however, have a number of constituents which when separated from each other have value. These comprise asphalt, gravel, sand, fine calcium carbonate particles, and binders such as fiberglass, asbestos, or paper. Used shingles also include steel fasteners, typically staples or shingle nails. Discarded asphalt paving has substantial amounts of gravel and sand (aggregate).

Further, some discarded shingles contain asbestos. Safe practice usually requires that the entire mass be treated as hazardous waste requiring expensive disposal. The need to treat large volumes of discarded shingles as hazardous because of a small amount of asbestos contained in them adds expense for the owner of the structure from which such shingles were removed.

The commercial value of the asphalt constituent in asphalt-based materials depends in part on the price of crude oil and in part on the fraction of the material that asphalt comprises. Increased price for crude oil increases the commercial value of the asphalt component of asphalt-based materials as well. Increased value of the asphalt and other constituents means that an efficient, inexpensive process for separating the constituent materials in discarded asphalt-based materials into relatively pure constituent streams becomes economically attractive.

Other processes recycle unused shingles and tear-offs by grinding them. The resulting particles can be used to make recycled asphalt shingles or as a component of road paving material. While this process does divert the shingle mass from landfills, it produces a particle mass having relatively small economic value compared to the value of substantially separated constituents of the shingles.

Processes for recycling other types of discarded asphalt-based materials operate differently, or in some cases, not at all. For example, asphalt paving may be ground and blended into new road pavement material A process able to separate the constituents of waste asphalt-based materials into nearly pure materials would produce materials having substantial value. These separated materials would be useable for all of the purposes that such materials normally have, including reuse in the manufacture of new asphalt-based materials. In those cases where asbestos is present in the worn asphalt-based materials, concentrating this hazardous material by such a process will reduce the disposal cost.

BRIEF DESCRIPTION OF THE INVENTION

A process for separating constituents of an asphalt-based material having as constituents at least asphalt and one solid non-asphalt material has the following steps. First, the asphalt-based material is shredded to form a shredded material mass comprising particles. Then solvent is mixed with the shredded material to dissolve the asphalt in the shredded material. This step forms a first slurry mass comprising asphalt dissolved in solvent, and solid materials.

Then the solid materials in the first slurry mass is separated from the dissolved asphalt in the first slurry mass to form a final solid materials mass and a final asphalt-solvent mass. The solvent and the asphalt in the final asphalt-solvent mass are then separated to form reclaimed solvent mass and an asphalt mass. The solvent may comprise at least one solvent selected from the group comprising hexane, toluene, IPA, methanol, Vertral, TCE, PCE, and MCL.

This process may run most efficiently as a continuous operation, where worn asphalt-based materials are received, and the indicated steps are done at dedicated stages in containment spaces. Preferably, the shredded material mass is provided as a shredded material stream, the first solvent is provided in a first solvent stream, and the first slurry mass is provided in the form of a first slurry stream. The final solid materials mass may be in the form of a final solid materials stream, the final asphalt-solvent mass may be in the form of a final asphalt-solvent stream, the reclaimed solvent mass may be in the form of a reclaimed solvent mass stream, and the asphalt mass may be in the form of an asphalt stream.

This process may be refined by including the steps of first mixing the first slurry stream with the first solvent stream to form a diluted first slurry stream. Then the solid materials in the diluted first slurry stream are separated from the solvent and dissolved asphalt in the diluted first slurry stream to form the final solid materials stream and the final asphalt-solvent stream.

The step of mixing the shredded material stream with the first solvent stream can be further refined by mixing the shredded material stream with the first solvent stream in a first containment space to produce the first slurry stream. Then the first slurry stream can be mixed with the first solvent stream in a second containment space to produce the diluted first slurry stream.

The efficiency of this process is markedly improved by mixing the shredded materials stream with the reclaimed solvent stream.

Removing fibrous materials from the final solid materials stream produces a first reduced solid materials stream and a stream of fibers. Thereafter solid granules, sand, gravel, calcium carbonate, etc. may be removed from the first reduced solid materials stream to produce further reduced solid materials streams.

DESCRIPTION OF THE PREFERRED EMBODIMENTS

Figure 1:
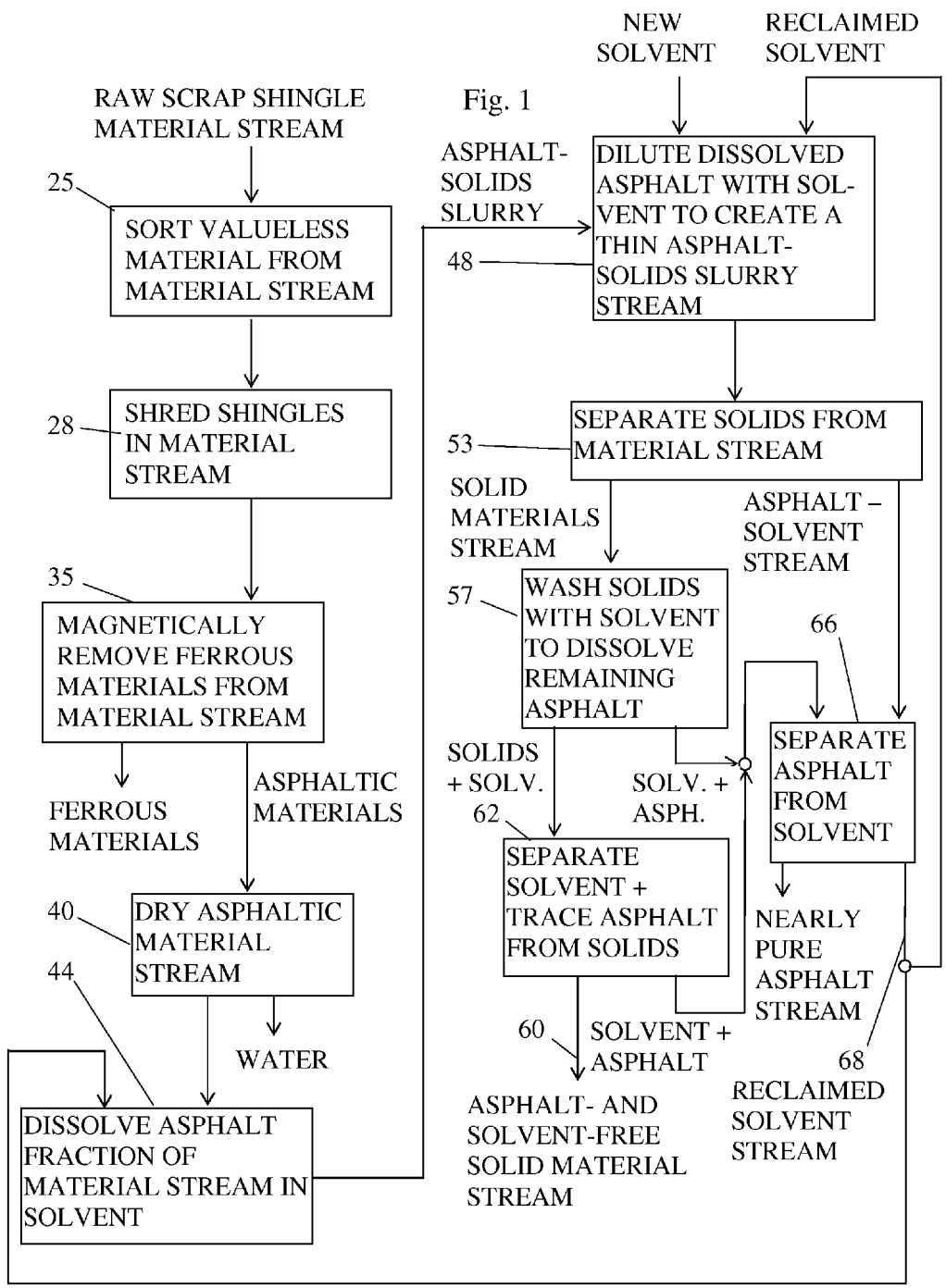
FIGS. 1 and 2 show the various steps of a recycling process for separating discarded (scrap) shingles into streams of nearly pure constituent materials.
Figure 2:
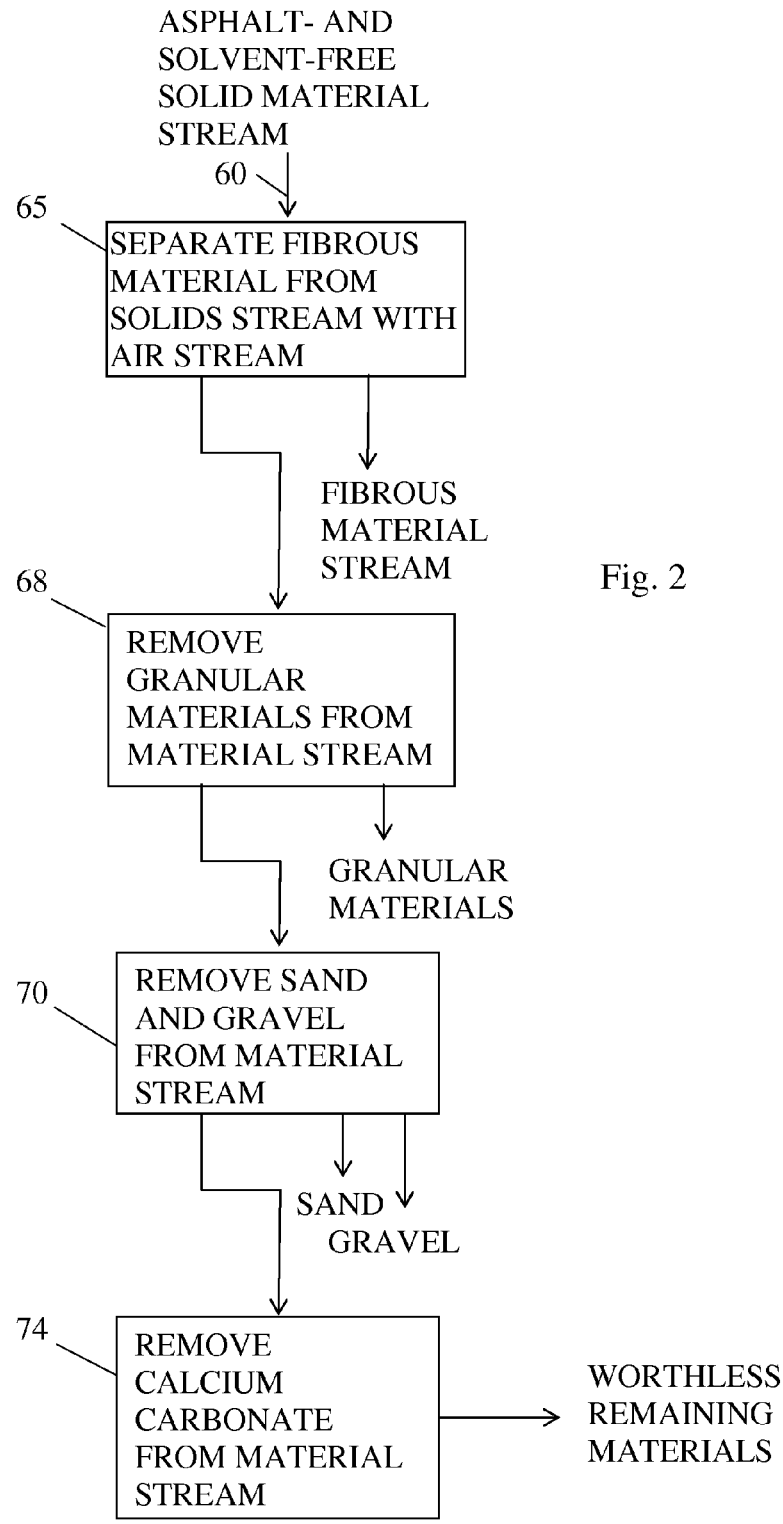

To serve as an example, the process the Figs. show is specific for scrap shingles, but with minor changes and omissions, is usable for other types of waste asphaltic or asphalt-based materials. Shingles are used as the primary example here because shingles typically have a wider variety of constituents than many other asphalt-based materials, and may have a higher concentration of asphalt than some other worn. For example, worn asphalt paving lacks the ferrous and fibrous materials and calcium carbonate found in shingles, so steps for separating these constituents will be unnecessary for processing asphalt paving.

The process operates most efficiently in a continuous mode, where shingles or other asphalt-based materials continually enter the process and the various constituents exit at various points of the process as material streams, although it may also operate in a batch mode. Hereafter "continuous" means that a material is fed into a containment space in which the activity of a step proceeds without pause, only stopping with an operator-induced shutdown such as material shortage may require. Each step of the continuous process may take place in a dedicated containment space comprising a separate tank, or in a compartment of a larger tank.

Initial Preparation of the Raw Material Stream

A recycler facility using the process of the Figs. receives for example, a stream of discarded shingles from a number of sites that collect shingles delivered by roofers. Roofers usually place torn off shingles in portable dumpsters that are unloaded at a collection site. Other types of asphalt-based materials may be collected in different ways.

Given that the process of this invention provides reusable materials having significant value, the economics of the recycling activity will likely in the case of shingles, allow roofers to dispose of the discarded shingles without charge or perhaps even be paid for them. In fact, this process when applied to scrap shingles, may produce economies that dictate removal of even a single layer of worn out asphalt shingles because of the value of its constituent materials.

In the process of the Figs., scrap asphalt-based materials are transported to the recycler from a collection site. In the case of scrap shingles, these pass through an initial step 25, comprising a "pick" or sorting line formed by a number of workers that remove large extraneous materials such as metal flashing, wood, etc. from the scrap shingle mass. The sorting line provides a shingle material stream having only the shingles and in the more usual case of torn off (used) shingles, the metal fasteners such as staples or shingle nails that attached them. This step is likely to be unnecessary for processing paving materials.

In step 28 a shredder, typically a hammer mill, grinds or shreds the asphalt-based materials in the material stream into a stream of coarse powder or particles. In the case of discarded shingle materials it is preferred that the hammer mill leave the fasteners essentially intact, but the process can deal with a situation where the fasteners have been cut or ground into smaller parts. Reducing scrap paving or wood products to particle size may require different but equally well known types of grinding techniques. All of these various types of reducing the initial material stream to particulates will be referred to generically as "shredding."

In step 35, which is likely only necessary for used shingles, magnets remove ferrous fasteners from the material stream for recycling. Most of the ferrous material will be removed in this step, but a second ferrous material removal step later in the process is also possible. The removed fasteners form a stream of recyclable ferrous material. The remaining material with ferrous material removed becomes a shredded asphalt-based materials stream.

Step 40 represents drying the shredded materials stream to remove any water that may be entrained in the material after grinding. A heat source for example may be used to vaporize the water in the shredded material stream. A dry shredded material stream can be processed more efficiently in the steps that follow.

Asphalt Extraction

Step 44 represents solvent processing of the dry, shredded asphalt-based materials stream in a conventional solvent processor to remove the asphalt constituent. This processing dissolves the asphalt constituent of the material stream to form a liquid or slurry comprising the asphalt solution in which the various solid constituents of the raw stream are present. This step may treat the slurry with both reclaimed and new solvent.

Dissolving the asphalt may comprise washing or mixing the material stream with the asphalt solvent in a solvent extractor such as Model IV submersion extractor available from Crown Iron Works Co., Minneapolis, Minn. U.S. Pat. No. 4,751,069 describes this extractor and how it is used.

Step 44 uses a processing solvent such as toluene, currently preferred because tests suggest superior performance for it. Other solvents such as hexane, IPA, methanol, Vertral, TCE, PCE, MCL, etc. may also work as well. Step 44 produces a first asphalt-solids slurry that is fed to a containment stage for processing according to step 48.

Step 48 specifies further dilution of the first asphalt-solids slurry with the same solvent of step 44 to produce a diluted first asphalt-solids slurry comprising the asphalt-processing solvent solution with the various solid materials in it. This dilution step 48 may comprise washing the first asphalt-solids slurry with solvent in a counterflow and continuous manner. Continuous operation makes this step very efficient. This step may also treat the slurry with both reclaimed and new solvent.

Preferably, the concentration of asphalt in the solution at this stage is 28% or less, although higher percentages may be acceptable. A smaller percentage of asphalt results in a lower viscosity slurry. The thinned stream of dissolved asphalt and suspended solids flows to step 53.

Step 53 removes almost all of the solids from the slurry produced by the activities of step 48 using filtration, centrifugation, etc. This step produces an asphalt-solvent liquid stream and a first solid materials stream. The first solid materials stream that step 53 produces comprises particles that are still coated with the asphalt-solvent liquid.

Due to the reduced viscosity for the slurry that is processed during step 53, separation of liquid and solids is possible to produce a stream of asphalt-solvent liquid having almost no solid materials. This liquid stream of solvent and asphalt can be distilled more easily in the following step 62 when the amount of solid materials in it is minimized.

Step 57 involves washing the first solid materials stream from step 53 with more solvent to rinse away any residual asphalt-solvent liquid, resulting in a low-asphalt solids-solvent stream having a very small concentration amount of asphalt, and in a liquid stream comprising liquid solvent having a low concentration of asphalt. In this stage, the solvent flows through a screen of some type after passing through the solids-solvent stream.

Equipment performing step 62 receives and treats the low-asphalt solids-solvent stream from the containment space of step 57 in a counterflow mode to remove the entrained solvent and trace asphalt, say by heating to vaporize the fluid materials. Some available processes for this step use steam treatment through a number of descending stages to remove the solvent and asphalt traces from the solids.

Step 62 may comprise a preferred treatment for the low-asphalt solids-solvent stream from separation step 53. In this treatment, the low-asphalt solids-solvent stream is conveyed to a closed vessel that uses heat to vaporize the solvent and asphalt traces entrained in the low-asphalt solids-solvent stream. The solvent- and asphalt-free solids that step 62 produces form a final solids stream on a path 60.

The final solids stream may be processed further to separate its various constituents. The separation of shingle constituents will be described below. For scrap paving, it may be only necessary to separate the sand and gravel. Should scrap paving include concrete, then a separation step for it may be desirable as well.

US Pat. Pub. 20030072867 discloses equipment for performing this preferred treatment for step 62 that removes the solvent from the solids. Step 62 treatment will result in a solids stream containing as little as 0.1% asphalt by weight and 200 parts per billion of solvent by weight. This low amount of residual asphalt and solvent allows reuse of portions of the resulting solids in for example, new shingles.

The vapors that step 62 creates flow via vacuum to the equipment that performs step 66 where the solvent condenses and flows through a duct 68 to recycle continuously through the process. Preferably, the condensed solvent on path 68 flows to the containment spaces of both steps 44 and 48 for reuse.

Step 66 uses a treatment such as fractional distillation of the asphalt-solvent solution, to separate the heavier asphalt phase and the lighter solvent phase, to produce a nearly pure asphalt stream and the reclaimed solvent stream on path 68. After cooling, the asphalt stream from this step is very similar to the asphalt material used during the manufacture of the original asphalt-based materials.

Further Solids Processing

Due to the nearly complete removal of asphalt from the solid materials forming the final solids material stream on path 60, the solvent- and asphalt-free solids can be further processed to separate the various constituents. Vibratory screeners, counterflow air streams, and other common mechanisms used by various material processing industries can separate particles in the final solids material stream by size and density. Preferably, solids separation also occurs in a continuous process. Even though some of these constituents have relatively low value, reclaiming them reduces disposal costs.

In one version of this process as applied to shingles, a step 65 uses an air stream separation device to remove the fibrous and low density material (cellulose, paper, fiberglass, asbestos, etc.) from the final solids material stream to produce a stream of fibrous material and a first reduced solids material stream. The nearly complete removal of the residual asphalt allows reuse of resulting fibrous material (other than asbestos) in many cases. This step may be unnecessary for some types of asphalt-based materials.

By properly selecting and adjusting the separation equipment that separates the fibrous material from the final solids material stream according to well-known practice, very low residual fiber is present in the first reduced solids material stream. The almost complete removal of the asphalt from the first reduced solids material stream allows reuse of the extracted fiber.

In some cases a raw shingle stream includes hazardous asbestos fibers. Removing nearly all of the fibrous material including the asbestos fibers from the solid materials increases the concentration of the asbestos, allowing disposal of a smaller total volume as hazardous waste. This reduces disposal costs. In addition, the first reduced solids material stream is no longer hazardous and may be reused or discarded using conventional precautions as appropriate.

Step 68 represents treatment that removes from the first reduced solids material stream, the granular material that forms the exposed surface of shingles, using for example a counterflow air column that relies on the surface area to density ratio of the granules. Due to the nearly complete removal of asphalt from the solids, airflow sorting of the granular material is efficient. The resulting granular material can be reused in manufacture of shingles or in the case of asphalt-based paving materials for high quality new paving. The resulting second reduced solids material stream may be further separated.

One should note that other processes that leave a significant fraction of the asphalt in the solids would also tend to leave a substantial fraction of residual granules in the remaining solid stream. The presence of excess asphalt material inhibits separation of granular material from the solids stream.

The second reduced solids material stream is then treated by the equipment that step 70 represents to remove any sand that is present. This too may be done by moving air separation, or by screening. The resulting asphalt-free sand material may be used as sand to again form shingles, or in the case of asphalt paving, for new paving material, or for other purposes as well. Here too, the almost complete previous removal of the asphalt from the final solid materials stream improves the separation of the sand from the remaining solids and allows its use as raw sand.

For asphalt-based paving materials, essentially all of the mass that is not asphalt is sand and gravel. It is commonplace to separate sand and gravel with screens, and doing so produces reusable materials. No further discussion of this step is necessary.

The remaining solid materials stream is then treated by the equipment of step 74 to remove the particles whose maximum dimension is approximately <100 microns. Experience shows that these particles typically have a high concentration of calcium carbonate. Again due to the completeness of the counterflow asphalt extraction that produces the solids stream on path 60, the residual asphalt is almost completely removed which allows for use of the resulting calcium carbonate in a wide variety of processes.

For example, the calcium carbonate can be used for liming acidic agricultural soils. If it were not for the almost complete removal of the asphalt this use would not be appropriate.

The solids that remain are just a fraction of the mass and volume of the original final solids material stream on path 60, and can be discarded in a landfill at little cost. Even here, the absence of asphalt in the remaining materials allows for less expensive discarding.

Other processes that do not or cannot remove all of the asphalt from the solids stream do not effectively separate each of the various constituent components from the final solids material stream on path 60.

One should note that the order in which materials are removed from the final solids material stream may vary from that disclosed above. One should also note that when applying this process to asphalt-based paving materials, the fiber-removing step 65 may be omitted if desired.

What we claim is:

1. A process for separating constituents of a solid material stream having as constituents at least asphalt and one solid material, comprising the steps of:
   a) shredding the material in the solid material stream to form a stream of shredded material mass;
   b) providing a first solvent stream;
   c) mixing the shredded material stream with the first solvent stream to dissolve the asphalt in the shredded material mass, to form a first slurry stream comprising a solution of asphalt dissolved in the first solvent, and solid materials;
   c) separating at least some of the solid materials in the first slurry stream from the asphalt and first solvent solution in the first slurry stream to form a final solid materials stream and a final asphalt-solvent solution stream; and d) separating the solvent and the asphalt in the final asphalt-solvent solution stream to form a reclaimed solvent stream and an asphalt stream.

2. The process of claim 1, including the steps of mixing the first slurry stream with the first solvent stream to form a diluted first slurry stream; and separating the solid materials from solvent and dissolved asphalt in the diluted first slurry stream to form the final solid materials stream and the final asphalt-solvent stream.

3. The process of claim 2 wherein the step of mixing the shredded material stream with the first solvent stream comprises mixing the shredded material stream with the first solvent stream in a first containment space to produce the first slurry stream, and then mixing the first slurry stream with the first solvent stream in a second containment space to produce the diluted first slurry stream.

4. The process of claim 3, further comprising the steps of mixing the shredded material stream with the reclaimed solvent stream to produce the first slurry stream; and separating the solid materials from the solvent and dissolved asphalt in the diluted first slurry stream to form a first intermediate solid materials stream and the final asphalt-solvent stream.

5. The process of claim 4, including the steps of mixing the first intermediate solid materials stream with a solvent stream to produce a second intermediate solid materials stream; and separating the solid materials from the solvent and dissolved asphalt in the first intermediate solid materials stream to form a second intermediate solid materials stream and the final asphalt-solvent stream.

6. The process of claim 5, including the step of removing fibrous materials from the final solid materials stream to produce a first reduced solid materials stream and a stream of fibers.

7. The process of claim 6 including the steps of removing solid granules from the first reduced solid materials stream to produce a second reduced solid materials stream; and removing sand from at least one of the first and second reduced solid materials stream to produce a third reduced solid materials stream.

8. The process of claim 2, including the step of mixing the shredded materials stream with the reclaimed solvent stream.

9. The process of claim 1, wherein the step of providing the solvent stream comprises at least one solvent selected from the group comprising hexane, toluene, IPA, methanol, Vertral, TCE, PCE, and MCL.

* * * * *